(12) United States Patent
Labout (10) Patent No.: US 7,011,197 B2
(45) Date of Patent: Mar. 14, 2006

(54) CLUTCH CONTROL SYSTEM AND METHOD

(76) Inventor: Andrew M. Labout, 9894 S. Fox Hill Cir., Highlands Ranch, CO (US) 80129

( * ) Notice: Subject to any disclaimer, the term of this patent is extended or adjusted under 35 U.S.C. 154(b) by 0 days.

(21) Appl. No.: 10/782,091

(22) Filed: Feb. 18, 2004

(65) Prior Publication Data

US 2004/0226394 A1 Nov. 18, 2004

Related U.S. Application Data

(60) Provisional application No. 60/448,423, filed on Feb. 18, 2003.

(51) Int. Cl.
*B60K 41/22* (2006.01)

(52) U.S. Cl. .................. 192/3.63; 192/30 W; 192/114 R
(58) Field of Classification Search ................ 192/3.63, 192/3.54, 3.61, 3.62, 114 R, 30 W; 340/438; 477/86; 701/67; 74/473.33
See application file for complete search history.

(56) References Cited

U.S. PATENT DOCUMENTS

| | | | | |
|---|---|---|---|---|
| 3,092,229 A | * | 6/1963 | Uher | 192/114 R |
| 4,722,426 A | * | 2/1988 | Bellanger | 192/30 W |
| 4,922,769 A | * | 5/1990 | Tury | 477/125 |
| 5,056,632 A | * | 10/1991 | Lemp et al. | 192/3.63 |
| 5,148,899 A | * | 9/1992 | Berger | 192/3.63 |
| 5,416,698 A | * | 5/1995 | Hutchison | 192/3.63 |
| 5,545,108 A | * | 8/1996 | Wagner et al. | 477/125 |
| 5,902,211 A | * | 5/1999 | Jones et al. | 192/30 W |
| 5,941,922 A | * | 8/1999 | Price et al. | 701/51 |
| 6,648,113 B1 | * | 11/2003 | Bellfy | 192/3.63 |
| 6,871,734 B1 | * | 3/2005 | Kupper et al. | 192/3.63 |
| 2004/0011152 A1 | * | 1/2004 | Danielsson et al. | 74/335 |

* cited by examiner

Primary Examiner—Rodney H. Bonck
(74) Attorney, Agent, or Firm—Timothy J. Martin; Michael R. Henson; John W. Carpenter (57) ABSTRACT

A clutch control system for a standard transmission includes a gearshift lever sensor that is mechanically coupled to the gearshift lever to sense the position thereof and produce a gear state signal. A monitor device is also provided to produce a signal corresponding to the vehicle's speed. A selectively actuable latch mechanism has an unlock state to permit the clutch to move from its transmission disabling state to an enabling state but may move to a lock state to prevent the clutch from moving to the enable state. A controller responds to the gear state signal and the speed signal to place the latch mechanism in the lock state when the speed of the vehicle is above a pre-selected maximum speed for the selected gear state. A method implemented by this system is also disclosed.

42 Claims, 6 Drawing Sheets

Fig.13

CLUTCH CONTROL SYSTEM AND METHOD

FIELD OF THE INVENTION

The present invention broadly relates to automotive control systems and methods implemented thereby. More particularly, the present invention is directed to an apparatus and method that interacts with the clutch assembly and transmission of a vehicle. The present invention specifically concerns a clutch control system and method which is operative to prevent the clutch of a manual transmission from engaging should the speed of a vehicle be excessive for a particular gear state.

BACKGROUND OF THE INVENTION

For thousands of years, humankind have been fascinated with contests of speed. Initially, foot races were held as a competition to determine the fastest runner. In addition, competitions were held wherein an animals speed was tested, such as horse races, chariot races and the like. With the invention of the automobile, the variety of contests of speed using mechanized transportation has increased. Automobile races take a variety of forms. One such race determines who can travel a given distance in the shortest amount of time.

Automobiles, of course, are known to have an engine which propels drive wheels through a transmission. Typically, transmissions provide a variety of gear ratios to couple the engine's output to the driven wheels in order to provide different torque ratios to the wheels. A driver typically engages the lowest gear state (which provides the highest torque) and accelerates the vehicle up to a selected speed after which the driver shifts to a higher gear. This process continues through the gear range so that the vehicle can reach its top speed. In some instances, the driver decelerates. In so doing, the driver downshifts from a higher gear to a lower gear in order to use the engine to brake the vehicle or to provide a condition of higher torque for a particular circumstance.

Transmissions are known to be of two types referred to as standard or "manual" transmissions and automatic transmissions. As is well known, a manual transmission requires a coupling of the transmission to the engine by way of a clutch assembly. A clutch assembly has an enabled state wherein the engine and the transmission are coupled and a disabled state to decouple the engine from the transmission. Typically, the driver of the vehicle depresses a clutch pedal mounted on a clutch arm or another mechanism that is, in turn, linked to the clutch assembly. The pressing of such pedal acts to move a friction plate off of the flywheel of the vehicle's engine so that the gear ratio of the transmission may be changed from one gear state to another. The actual changing of gear states is accomplished by means of a gearshift lever, as is well known. Allowing the clutch pedal to return to its normal position reengages the friction plate to the engine thereby recoupling the transmission to the engine output.

An automatic transmission, however, eliminates the use of this clutch assembly system so that the transmission changes it gear ratio in response to different load conditions on the vehicle. The automatic transmission is favored for ease and convenience by many people under normal driving conditions. Under race conditions, though, most drivers prefer to use a manual transmission. It is thought that a manual transmission gives the driver greater control over the driving conditions allowing the driver to select a desired gear ratio rather than allowing the automatic transmission to select the gear state.

The use of differing gear ratios is necessary, whether the transmission be automatic or manual, in order to prevent the turning of a particular engine at an excessive rate of revolution. Typically, an engine is known to have a "red line" over which potential damage to the engine will result should the engine's revolutions per minute exceed such limit. The gear ratios of the transmission thus allow the driver to control the revolutions of the engine for a given speed so as not to damage the engine. Thus, as the driver shifts upward in gears, the engines RPM (revolutions per minute) will remain ideally below the red line condition. Normally, this is a fairly easy matter to control during the acceleration of the engine.

When the driver is downshifting with a manual transmission, however, there is a potential for harm to the engine should the driver skip a gear. Thus, for example, should the driver be in a higher gear, such as a fourth or fifth gear, and desire to downshift into third gear. The driver accordingly depresses the clutch pedal to disengage the clutch assembly and manipulates the gearshift lever to change the gear state of the transmission. A problem may arise if the driver misses the next lower (third) gear and inadvertently shifts the transmission into a first or second gear. Since the vehicle's speed is coupled to the transmission's output and, since the transmission's output is coupled to the transmission's input through the selected gear ratio, the RPM of the transmission input may be driven by the vehicle's momentum at a rate that is excessive for the engine. More particularly, should the driver depress the clutch pedal and disengage the clutch and subsequently shift into an incorrect lower gear, the reengagement of the clutch will tend to drive the engine at an rate of revolution that is above the red line since the speed and inertia of the vehicle will now be coupled directly to the engine.

In cases where a driver miss-shifts, particularly in a racing condition, extreme damage to the engine can result from placing the vehicle in a gear range that is too low for the existing speed of the vehicle. Such damage can include the destruction of the valves, the crankshaft and other vital engine components. In effect, this damage destroys the engine preventing the vehicle from completing the race. This not only is inconvenient, but also can be quite costly due to the costs of engines in general and the very high costs of racing engines, specifically. Moreover, shifting the vehicle into a much lower gear can cause an over-braking due to the inertial mass of the engine and can create a dangerous situation and a risk of injury for the driver due to loss of control of the vehicle.

This problem has long been recognized and it is desirable to prevent engagement between the transmission and the engine during downshifting events should the proper gear range not be selected by the driver. While there have been attempts to solve this problem, there have been no known successful solutions to the Applicant. While clutch assemblies may be provided with spring loaded shift gates that are supposed to keep the driver from engaging gears that are too low for the speed of the vehicle, this approach does not work well on vehicles that are equipped with certain shift patterns and does not stop the driver from engaging the wrong gear if the driver applies enough force on the shift lever. The present invention is directed to resolving this problem and need.

SUMMARY OF THE INVENTION

It is an object of the present invention to provide a clutch control system and method that monitors the speed of the vehicle and the gear state selected.

It is further object of the present invention to provide a clutch control system and method that will help reduce the likelihood of damage to an engine should a driver engage the wrong gear state for the transmission relative to the speed of the vehicle.

Still a further object of the present invention is to provide a clutch control system and method that can be mounted in a retrofit manner onto an existing vehicle.

It is a further object of the present invention to provide a clutch control system and method that locks the clutch pedal in a position wherein the clutch assembly is disengaged during a downshift operation in those circumstances wherein the speed of the vehicle will over-rev the engine.

According to the present invention then, a clutch control system is adapted for use on a vehicle that has a frame and wheels and that is equipped with an engine selectively coupled to a clutch assembly to a manual transmission so as to drive the vehicle at a selected speed. The clutch assembly has an enabled state wherein the engine and the transmission are coupled and a disabled state wherein the engine and the transmission are not coupled. The transmission includes a plurality of gear states and includes a gearshift lever moveable among a plurality of gearshift positions each corresponding to a selected one of the gear states.

Broadly, the invention includes a gear shift lever sensor that is mechanically coupled to the gear shift lever and that is operative to sense at least one of the gear shift positions corresponding to a selected one of the gear states and produce a gear state signal indicative thereof. A monitor device is operative to produce a speed signal indicative of the speed of the vehicle. A selectively actuable latch mechanism is associated with the clutch assembly and has an unlocked state that allows the clutch assembly to move from the disabled state to the enabled state and a locked state that prevents the clutch assembly from moving from the disabled state to the enabled state. Finally, the invention broadly includes a controller that is operative in response to the gear state signal and to the speed signal to place the latch mechanism in the locked state when the speed of the vehicle is above a pre-selected maximum speed for the selected one of the gear states.

More specifically, the vehicle may include a reciprocating clutch pedal linked to the clutch assembly with the clutch pedal operative to move between a first position wherein the clutch assembly is in the enabled state and a second position wherein the clutch assembly is in the disabled state. In such circumstance, the latch mechanism is associated with the clutch pedal and is operative to move between a clutch pedal lock position wherein the clutch pedal is held in the second position and a clutch pedal release position wherein the clutch pedal may move from the second position to the first position. A clutch pedal may be supported by a reciprocating clutch pedal arm that is linked to the clutch assembly. The latch mechanism may then include a catch disposed on the clutch pedal arm and a latch bolt moveable between an unlatched position defining the unlocked state wherein the clutch pedal may move from the second position into the first position and a latched position defining the locked state wherein the latch bolt engages the catch thereby to prevent the clutch pedal from moving from the second position to the first position.

In this embodiment, the catch may be positionally adjustable relative to the clutch pedal arm. The latch bolt support is operative to mount the latch bolt relative to the vehicle. The latch bolt may be pivotally disposed on the latch bolt support such that the latch bolt pivots between the latched and unlatched positions. The latch bolt support may also be moveable relative to the vehicle whereby the orientation of the latch bolt relative to the break pedal may be adjusted.

In any event, an actuator is provided to move the latch mechanism, such as the latch bolt, from the unlatched position to the latched position. The latch bolt may be biased into the unlatched position. The actuator may be a solenoid operative to move the latch bolt.

In the disclosed embodiment, the gearshift lever sensor is operative to sense a plurality of different gearshift positions and produce a respective gear state signal indicative thereof. The gearshift lever sensor can include a gearshift follower engaging the gearshift lever. This gearshift follower is operative to follow the motion of the gearshift lever, and a position detector is associated with the gearshift lever follower. The position detector is then operative to sense the gearshift position and generate the gear state signal corresponding thereto. In this embodiment, the position detector can include an encoder, such as an optical encoder, and at least one code plate is provided. In the disclosed embodiment, a pair of code plates are provided for the optical sensor. Here, one code plate is used to sense the gear plane of the gearshift lever while the other code plate is operative to sense the gearshift level of the gearshift lever.

The gear shift follower is disclosed as a first slide bracket having a pair of spaced apart first arms for receipt of the gear shift lever therebetween such that the gear shift lever can reciprocate in a first direction between a plurality of shift levels while the first slide bracket remains stationary. The gear shift follower also includes a second slide bracket having a pair of spaced apart second arms for receipt of the gear shift lever therebetween such that the gear shift lever can reciprocate in a second direction between a plurality of shift planes while the second slide bracket remains stationary. The first and second directions, in such situations, are orthogonal to one another. The slide brackets, if desired, can be biased toward a selected shift level and toward a selected shift plane. The first slide bracket may be supported for sliding movement relative to a housing by a pair of spaced apart first rails. Likewise, the second slide bracket may be supported for sliding movement relative to the housing by a pair of spaced apart second rails.

The system can include an analog to digital converter which receives the speed signal and the gear state signal for communication to a controller, such as a computer processor. The computer processor then instructs the system to place the latch mechanism in a locked state or to allow the latch mechanism to remain in the unlocked state. An alarm may also be provided to indicate when the control replaces the latch mechanism in the lock state. The monitor device is operative to monitor rotational speed of the vehicle. This can be accomplished by monitoring the rotational speed of at least one of a group consisting of: a wheel of the vehicle, an axle of the vehicle, a drive shaft of the vehicle, an output of the transmission, an input of the transmission, and a transmission gear. In the disclosed embodiment, the monitor device is a magnet mounted to the rotating member in a hall effect sensor operative to count the rotations of the rotational element.

The present invention also contemplates a method for controlling enablement of the clutch assembly including any of the steps inherent in the above-described structure.

Broadly, the method includes setting a maximum speed for at least a selected one of the gear states. The method includes the step of monitoring the selected speed of the vehicle and monitoring the gearshift position of the gearshift lever to determine the gear state of the transmission. The method then includes the step of comparing the speed the vehicle with the maximum speed for the selected one of the gear states when the clutch assembly is placed in the disabled state and the gearshift lever is thereafter moved into the gearshift position that corresponds to the selected one of the gear states. Thereafter, the method either permits the clutch assembly to move from the disabled state to the enabled state when the speed of the vehicle is no more than the maximum speed or prevents the clutch assembly from moving from the disabled state to the enabled state when the speed of the vehicle exceeds the maximum speed.

According to the more detailed method, the step of setting a maximum speed for a plurality of selected gear states may be included, and the step of comparing the speed of the vehicle with the maximum speed for each of the plurality of gear states may be undertaken. Here, when the clutch assembly is placed in the disabled state and the gear shift lever is moved into the gear shift position that corresponds to a respective one of the plurality of gear states, the method thereafter includes the step of either permitting the clutch assembly to move from the disabled state to the enabled state when the speed of the vehicle is no more than the maximum speed or preventing the clutch mechanism from moving from the disabled state the enabled state when the speed of the vehicle exceeds the maximum speed.

The step of preventing the clutch assembly from moving from the disabled state to the enabled state may be accomplished by mechanically locking the clutch assembly. The step of mechanically locking the clutch assembly may be accomplished by mechanically latching the clutch pedal in the depressed or second position. Further, this step may be accomplished by latching the clutch pedal arm.

The step of setting the maximum speed for a respective gear state can be accomplished by storing shift data and speed data in the memory in a computer processor when the speed data is correlated to the maximum speed for the selected one of the gear states and wherein the shift data corresponds to the gear shift position corresponding to the selected one of the gear states. The step of monitoring the gear shift position can be accomplished by a position detector mechanically linked to the gear shift lever, and, here, the position detector may include at least one code plate linked to the gear shift lever and an encoder operative to generate a gear state signal in response to a position of said code plate relative thereto. The step of monitoring the gear shift position may be accomplished by first determining a gear shift plane for the gear shift lever and thereafter determining to which gear shift lever within the gear shift plane the gear shift lever is moved.

These and other objects of the present invention will become more readily appreciated and understood from a consideration of the following detailed description of the exemplary embodiment of the present invention when taken together with the accompanying drawings, in which:

DETAILED DESCRIPTION OF THE EXEMPLARY EMBODIMENTS

The present invention broadly concerns control systems and methods for automobiles. More specifically, however, the present invention is directed to a clutch control system that is operative to prevent the clutch from placing the engine and the transmission in a coupled state when the speed of the vehicle exceeds the maximum speed for a selected gear state. Accordingly, the present invention provides a safety mechanism directed to protecting against damage to the engine should the operator of the vehicle, i.e. the driver, incorrectly downshift a manual transmission.

As is well known, a motor vehicle typically includes a frame and wheels, and an engine is provided to drive the wheels thereby to propel the vehicle along the desired surface. The engine is coupled to the drive wheels by means of a transmission. Where a manual transmission is employed, a clutch assembly is located between the engine and the transmission. When the clutch is in an enabled state, the engine and the transmission are coupled together such that the rate of revolution of the engine, typically measured in revolutions per minute (RPM), is directly correlated to the rate of revolution of the driven wheels of the vehicle through the gear ratio established by the transmission. When the gear ratio is desired to be changed, the clutch assembly is moved to a disabled state. This decouples the transmission from the engine so that it is easier to shift the gears from one gear state to another, which is typically intended to be from one gear state to an adjacent gear state. Shifting, then, is accomplished by means of a gearshift lever that has selected gearshift positions corresponding to the gear states of the transmission. Further, as is known, the clutch assembly is typically operated by means of a clutch pedal that is typically supported by a reciprocating clutch pedal arm that is linked to the clutch assembly. The operator depresses the clutch pedal with his/her foot which moves the clutch assembly from the enabled state to the disabled state. After shifting the vehicle, removing the foot from the clutch pedal allows the clutch assembly to be restored to the enabled state thereby reengaging the transmission and the engine.

Figure 1:
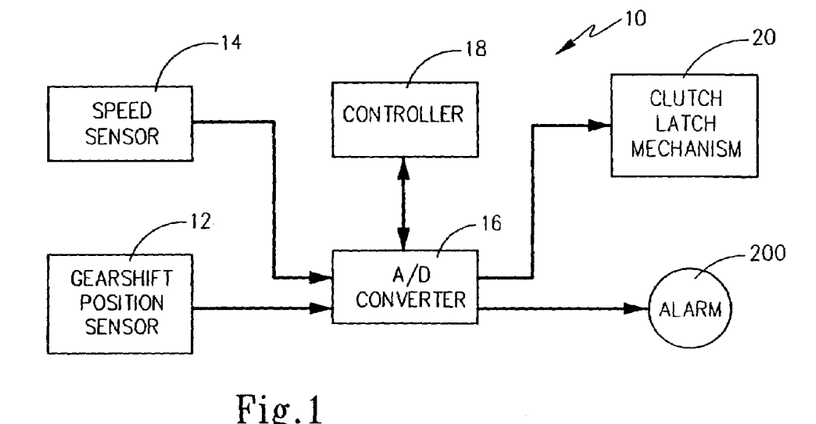
FIG. 1 is a diagrammatic view showing the components of the clutch control system according to the present invention used to accomplish the method of the present invention.

FIG. 1 introduces a diagrammatic view of the clutch control system 10 according to the present invention. Here, it should be appreciated that the clutch control system includes subsystems or mechanisms that interact with one another to protect the vehicles engine. As is illustrated in FIG. 1, the clutch control system of the present invention includes a gearshift position sensor 12 that is operative to produce a gear state signal indicative of the gear state for the transmission. A speed sensor 14 senses the speed of the vehicle and is operative to produce a speed signal indicative thereof. The speed signal and the gear state signal are digitized by an analog to digital converter 16 which communicates with a controller 18. The controller is programmed with a maximum speed for one or a plurality of gear states for the vehicle's transmission. In this invention, then, if the speed sensor indicates that the speed is greater than that acceptable for the particular gear state into which the transmission is shifted, as determined by the gear shift position sensor, the controller 18 operates a selectively actuate a clutch latch mechanism 20 to prevent the clutch assembly of the vehicle from moving from a disabled to state to the enabled state. While not required, it is desirable that some sort of an alarm display 200 be provided to indicate either a visual or audible alarm indicating that the clutch latch mechanism 20 has been activated. Controller 18 may be any suitable programmable microprocessor having a communication capability and sufficient memory. An example of would that known as the PalmPilot marketed by Palm One, Inc. of Mountain View, Calif.

Figure 2:
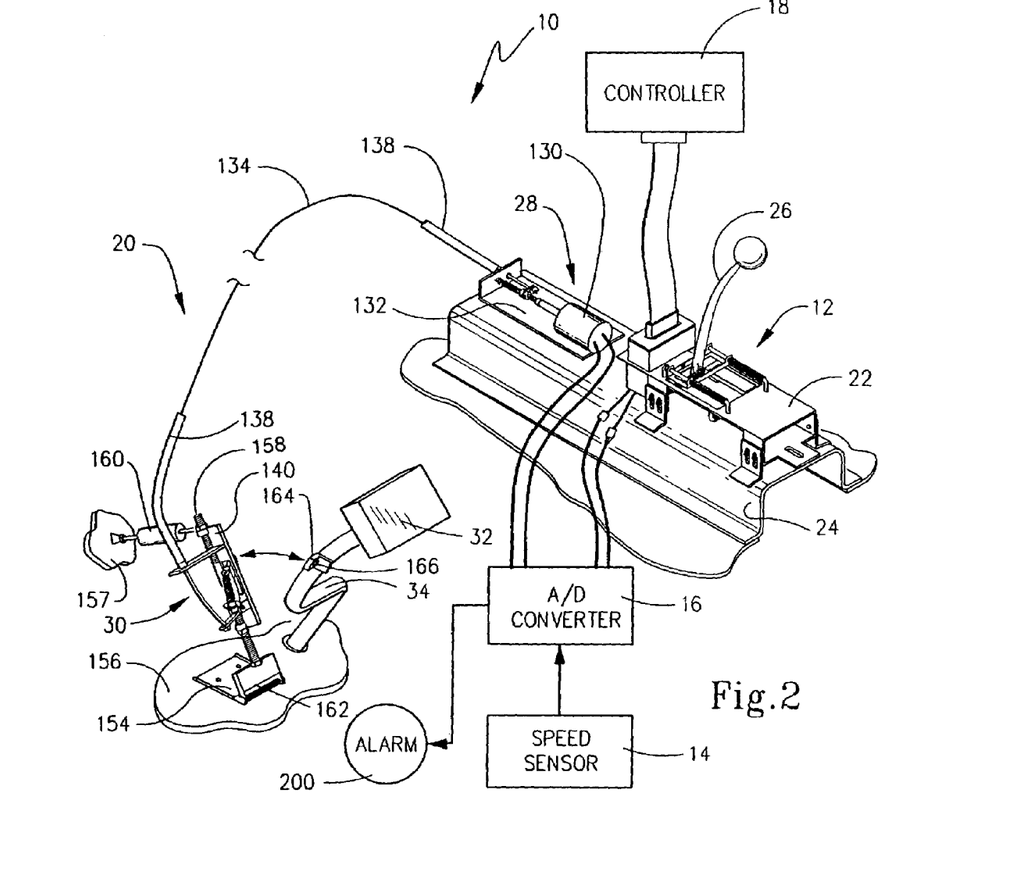
FIG. 2 is a partial diagrammatic and partial perspective view of the clutch control system and method according to the present invention.

With reference to FIG. 2, then, a partial diagrammatic and partial perspective view of the exemplary embodiment of the present invention is illustrated. In this figure, it may be seen that gear shift position sensor 12 includes a housing 22 that is adapted to mount on a floor portion 24 of the vehicle so as to be mechanically coupled to a gear shift lever 26 as described more thoroughly below. Gear shift position sensor 12 is in electrical communication with controller 18 through analog to digital converter 16 so that controller 18 receives a gear state signal that corresponds to the position of gear shift lever 26. Speed sensor 14 is also connected through analog to digital converter 16 to controller 18 so that controller 18 receives a digital signal corresponding to the speed of the vehicle. Once again, optional alarm 200 is provided to receive a signal from controller 18 through analog to digital converter 16 so as to signal when controller 18 has placed the clutch lock mechanism in an active state disabling the clutch assembly.

As illustrated further in FIG. 2, then, the clutch latch mechanism 20 includes an actuator 28 in the form of a solenoid that is mechanically coupled to a clutch pedal latch mechanism 30 that is associated with clutch pedal 32. As illustrated, clutch pedal 32 is supported by a reciprocating clutch pedal arm 34 that, as is known in the art, is linked to the clutch assembly located between the transmission and the engine of the vehicle.

Figures 3, 5:
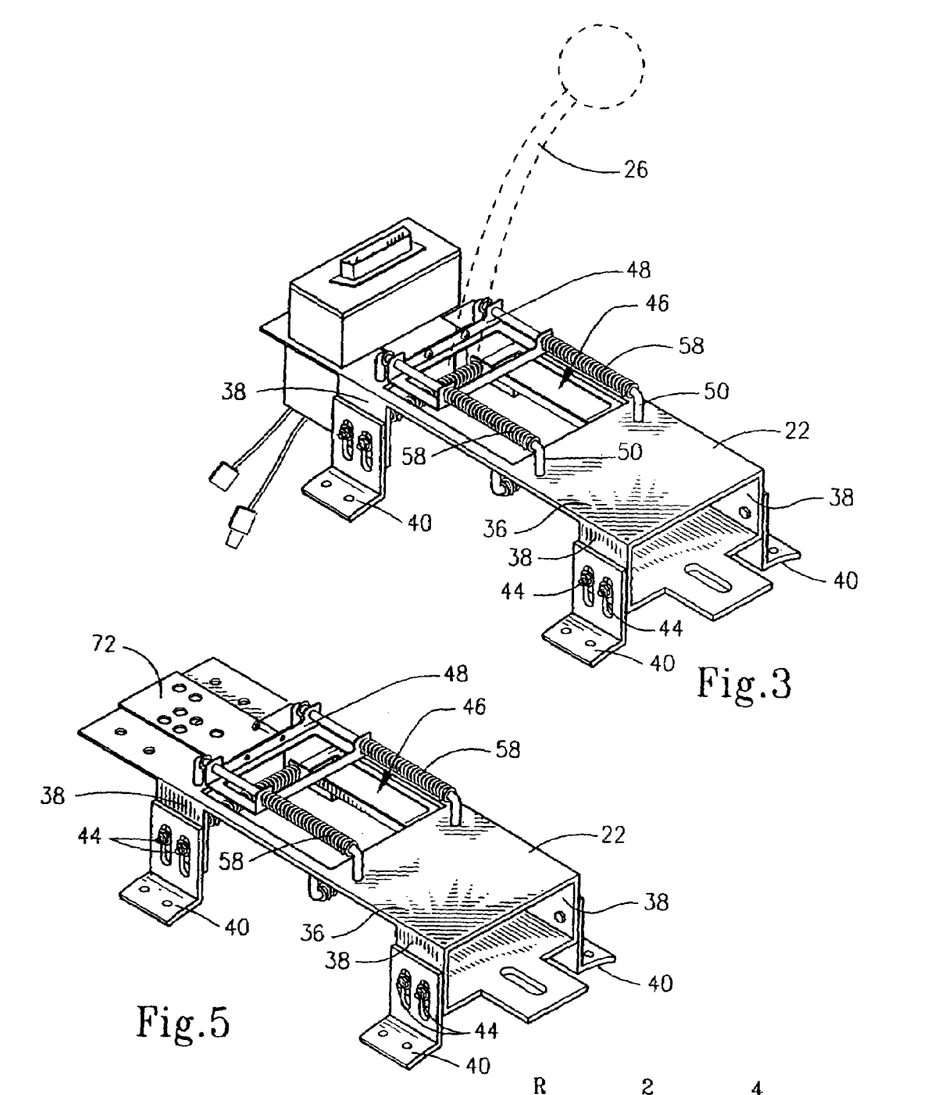
FIG. 3 is a perspective view of the gearshift lever sensor according to the exemplary embodiment of the present invention.
FIG. 5 is a perspective view of a portion of the gearshift lever sensor shown in FIGS. 3 and 4.
Figure 4:
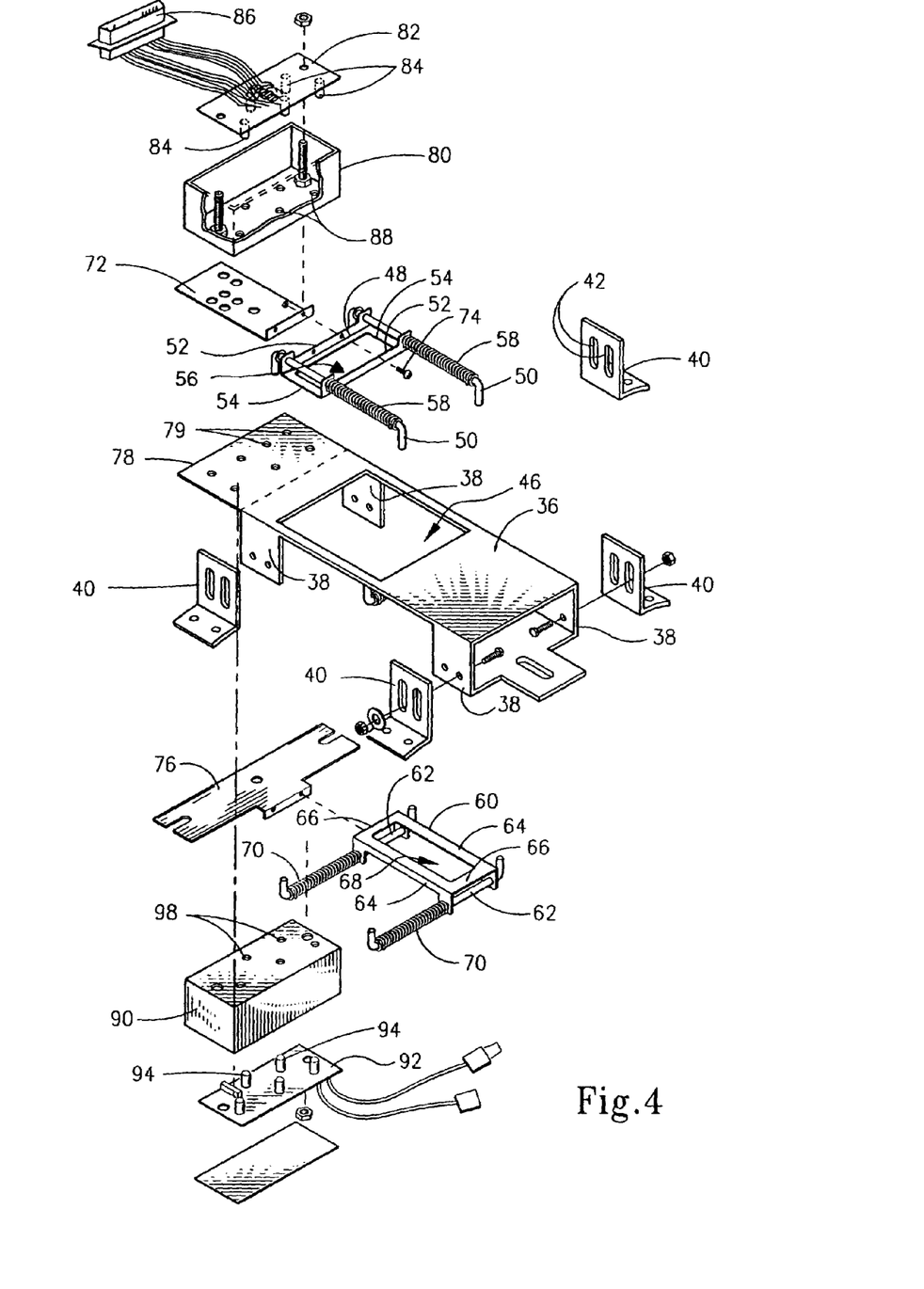
FIG. 4 is an exploded perspective view of the gearshift lever sensor of FIG. 3.

In order to appreciate the structure of the gearshift lever sensor 12, reference is made to FIGS. 3–5. Here, it may be seen that gear shift lever sensor 12 includes housing 22 that includes a flat support plate 36 having downwardly depending tabs 38 so that housing 22 may be secured to the vehicle by means of L-shaped brackets 40. L-shaped brackets 40 are provided with slots, such as slots 42, so that the height of support plate 36 may be selectively adjusted. Each L-shaped bracket 40 is secured to a tab 38 by means of a nut and bolt combination 44.

Support plate 36 has a generally square-shaped central opening 46 through which gearshift lever 26 may extend. Gearshift lever sensor 12 is mechanically coupled to the gearshift lever in order to sense the gearshift positions thereof. By this it is meant that the gearshift lever sensor follows the gearshift lever. This can include an element that engages the gearshift lever shaft or that is biased into contact. In this illustrated embodiment, though, a first slide bracket 48 is mounted on a pair of spaced apart first rails 50 that are parallel to one another and that flank opening 46. First slide bracket 48 includes a pair of spaced apart first arms 52 that extend transversely between rails 50 and are interconnected by webs 54 so as to create an elongate opening 56 through which the shaft of gearshift lever 26 extends. Opening 56 is configured such that gear shift lever 26 may move in a first direction, such as left and right, to change the gear shift planes (as described below) while slide bracket 48 remains stationary. However, movement of gearshift lever 26 between different gearshift levels causes slide bracket 48 to slideably move along rails 50. As is illustrated in FIGS. 3–5, springs 58 bias first slide bracket 48 into a selected gearshift level.

A second slide bracket 60 is mounted on the underside of support plate 36 with second slide bracket 60 being supported on a pair of spaced apart, parallel rails 62 that flank opening 46. Second slide bracket 60 includes a pair of second arms 64 joined by webs 66 so as to create an elongate opening 68. As may best be seen in FIG. 4, elongate opening 68 is oriented orthogonally to elongate opening 56. Here, again, arms 64 are separated a distance so as to engage the shaft of gearshift lever 26. Gearshift lever 26 may be able to reciprocate in a second direction that is orthogonal to the first direction so as to allow the gearshift lever to move between different gearshift levels while slide bracket 60 remains stationary. However, movement of gearshift lever to the left or right, corresponding to a change of gearshift planes, causes slide bracket 60 to move correspondingly to the left or right. Springs 70 bias second slide bracket 60 into a selected gearshift plane.

Figure 6:
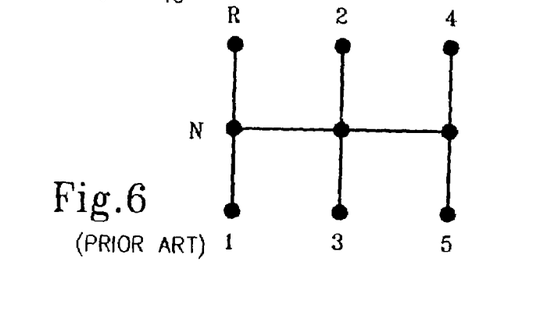
FIG. 6 is a diagrammatic view of a shift pattern for a gearshift lever according to the prior art.
Figures 7, 10, 11:
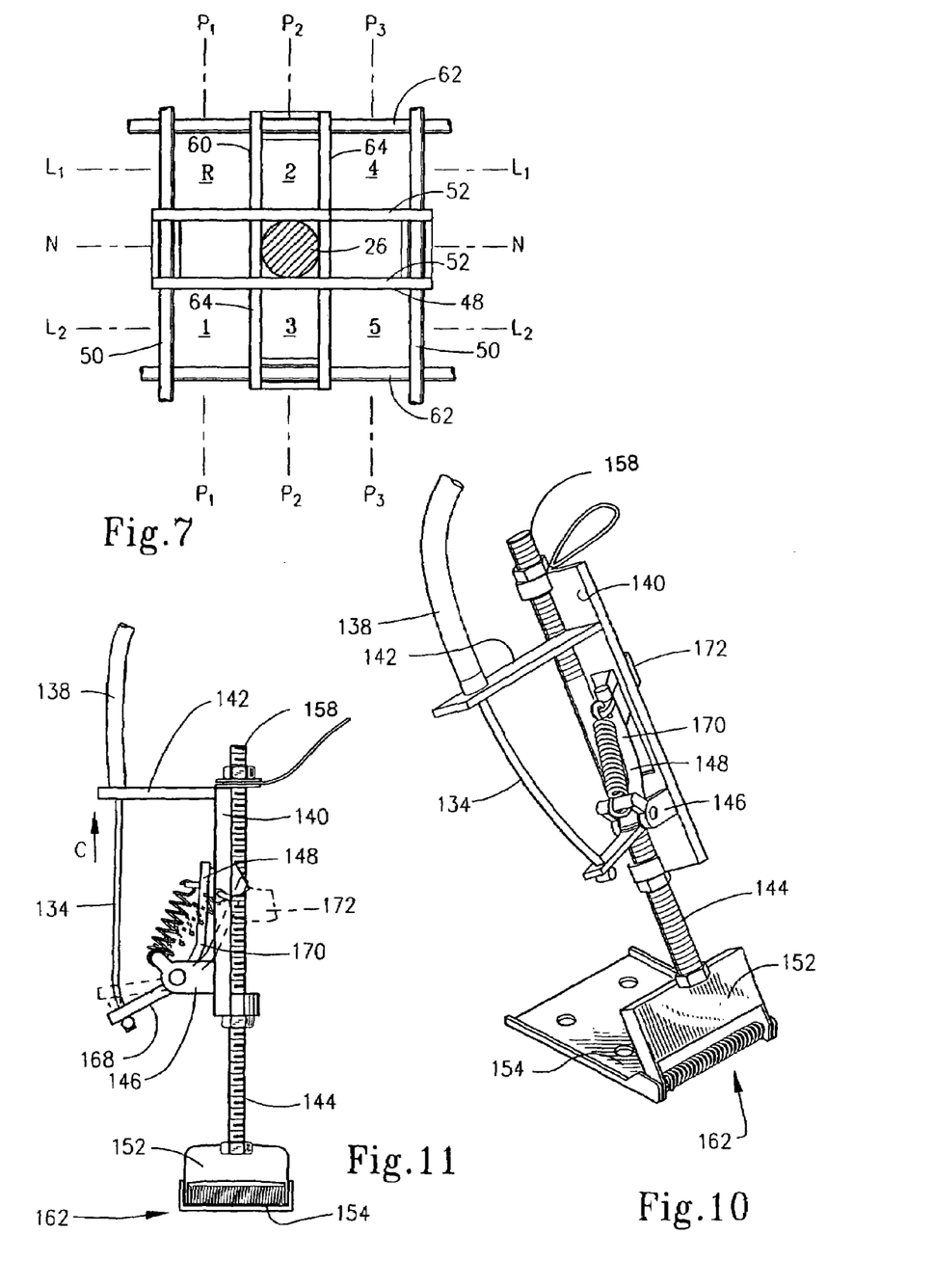
FIG. 7 is a top plan view of the slide brackets according to the present invention which mechanically couple the gearshift lever sensor to the gearshift lever.
FIG. 10 is a perspective view of the latch mechanism used to engage the clutch arm of the clutch pedal according to the present invention.
FIG. 11 is an end view in elevation of the latch mechanism of FIG. 10.

With reference to FIGS. 6 and 7, it may be appreciated that slide brackets 48 and 60 act to mechanically couple and follow the motion of gearshift lever 26 and may be used to sense the position thereof. In FIG. 6, a prior art diagram of a representative gearshift pattern for a manual transmission is illustrated. Here, it may be seen that there are nine positions for the gearshift lever. A first gearshift plane $P_1$ includes the gears R (Reverse), N (Neutral), and 1 (First). A second gearshift plane $P_2$ includes the gearshift levels 2 (Second), N (Neutral) and 3 (Third). A third gearshift plane $P_3$ includes gears 4 (Fourth), N (Neutral) and 5 (Fifth). Thus, three gearshift levels are also presented. Here, a first gearshift level $L_1$ includes the gears reverse, second and fourth, a second gearshift level $L_2$ includes gears first, third and fifth while a third gear shift level N includes comprises "neutral" for all three gearshift planes. Accordingly, the gearshift lever can have six positions corresponding to gears first through fifth along with reverse, and three neutral positions being in the neutral level to the left, middle and right.

With reference to FIG. 7, it may be seen that slide brackets 48 and 60 trap gearshift lever 26 between their respective arms 52 and 64. When in the neutral level, as is shown in FIG. 7, gearshift lever 26 may move to the left and right. This causes slide bracket 60 to correspondingly move to the left and right while slide bracket 48 remains stationary.

Therefore, slide bracket 60 determines the gearshift plane $P_1$ (including gears R, N and 1), intermediate gearshift plane $P_2$ including gears (2, N, 3) and gearshift plane $P_3$ (including gears 4, N, 5). Similarly, once a selected gearshift plane $P_1$–$P_3$ is selected, the gearshift lever 26 may be moved from the neutral level into either of levels $L_1$ (corresponding to gears R, 2 and 4) or $L_2$ (corresponding to gears 1, 3 and 5). When gearshift lever 26 is moved between the gearshift levels, slide bracket remains stationary while slide bracket 48 is moved upwardly and downwardly. Accordingly, there are nine discreet orientations of slide brackets 48 and 60 which correspond to the nine possible positions of the gearshift lever 26.

Returning to FIGS. 3–5, it may be appreciated that the positions of slide brackets 48 and 60 may be used to sense or mechanically monitor the position of gearshift lever 26. To this end, a first code plate 72 is mounted to slide bracket 48 by means of screws, such as screws 74. A second code plate 76 is mounted to slide bracket 60, again by screws or other fasteners. As is seen in FIG. 4, support plate 36 includes a wing portion 78 that helps support and guide code plates 72 and 76. To this end, code plate 76 is located underneath wing portion 78 while code plate 72 is located above wing portion 78 for sliding movement therealong.

As discussed more thoroughly below, code plates 72 and 76 are provided with a pattern of transmission ports so that the positions of slide brackets 48 and 60, and thus the position of gearshift lever 26 may be optically determined. To this end, wing portion 78 also has openings 79 in a pattern that correspond to the arrays of transmission ports. Wing portion 78further provides a mount that receives a first sub housing 80 that mounts a circuit board 82 that carries a plurality of photo transistors 84 that are electronically coupled to a DB 25 male connector 86. Sub housing 80 includes holes 88 that are in a common pattern as phototransistors 84.

A second sub housing 90 mounts to wing portion 78 on the underside thereof. Sub housing 90 serves to house a second circuit board 92 that supports a plurality of infrared light emitting diodes 94 that are organized in an array that corresponds to the array of phototransistors 84 and holes 88. Sub housing 90 includes a plurality of holes 98 also organized to have this common configuration. In the exemplary embodiment, five infrared LEDs and five infrared sensitive phototransistors are employed.

Accordingly, when assembled and suitably powered, light emitting diodes 94 emit light which passes through holes 98 and through holes 88 so as to be received by phototransistors 84, as is well known in the art. The selected passage or interrupting of these light paths may be used to optically encode the position of slide brackets 48 and 60, as discussed below.

Figure 8A:
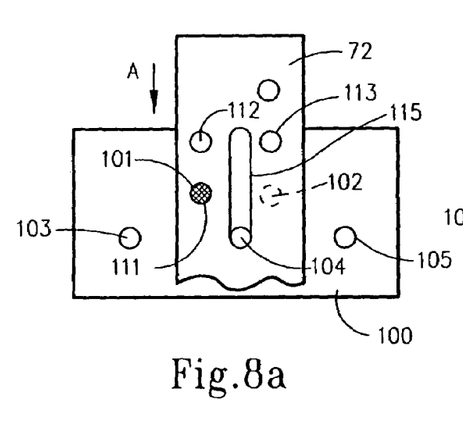
FIGS. 8(a)–8(c) are diagrammatic views showing positions of a first code plate according to the present invention used to determine the gearshift plane.
Figure 8B:
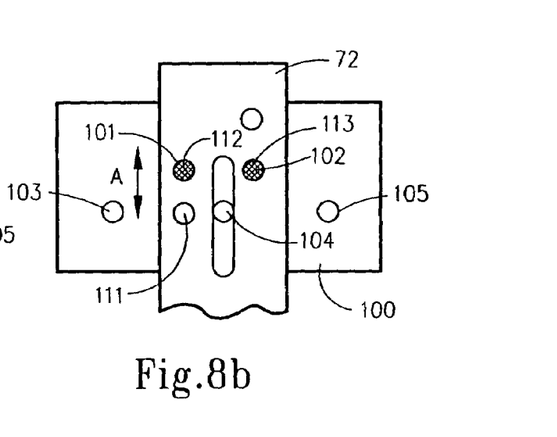
Figure 8C:
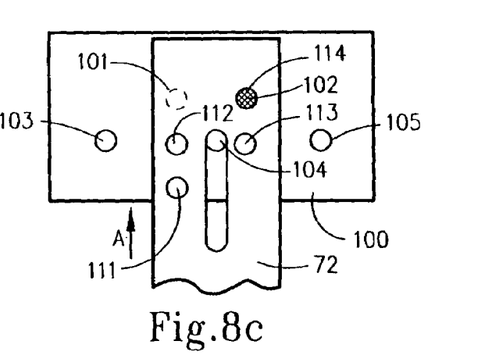

With reference, then, to FIGS. 8(a)–8(c) and 9(a)–9(c) it may be seen that first code plate 72 interface with a representative array 100 representing five light paths 101–105. Light paths 101–105 correspond to the array or matrix of light emitting diodes 94 and phototransistors 84 as well as holes 98, holes 79 and holes 88. With reference to FIGS. 8(a)–8(c), it may be seen that slide plate 72 may reciprocate in the direction arrow "A" between an upper most position shown in FIG. 8(a) through an intermediate shown in FIG. 8(b) and to a lower most position shown in FIG. 8(c). In the upper most position, FIG. 8(a), transmission port 111 registers with light path 101 so that the respective phototransistor becomes conductive therefore producing a signal that the gearshift lever have been placed in level $L_1$. Movement of code plate 72 in the direction of arrow "A" to the intermediate position, FIG. 8(b), places transmission ports 112 and 113 in alignment, respectively, with light paths 101 and 102 so that two of the phototransistors become conductive producing a gear shift position or gear state signal that corresponds to the neutral plane. Continuing with reciprocation of code plate 72 to the lower most position FIG. 8(c) places transmission port 114 in alignment with light path 102 so that a second phototransistor, only, becomes conductive. This corresponds to shift level $L_2$.

Figure 9A:
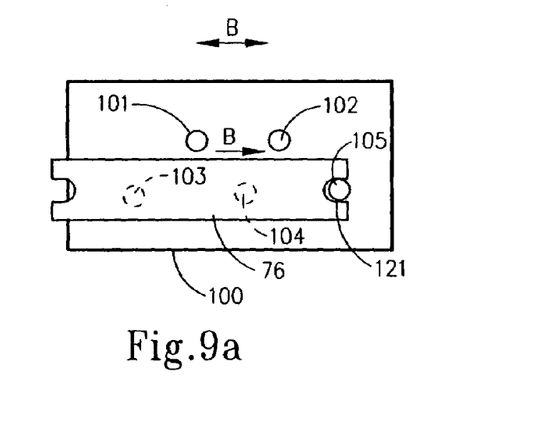
FIGS. 9(a)–9(c) are diagrammatic views showing positions of a second code plate used to determine the gearshift level according to the present invention.
Figure 9B:
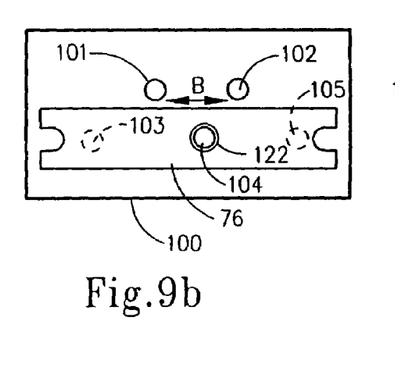
Figure 9C:
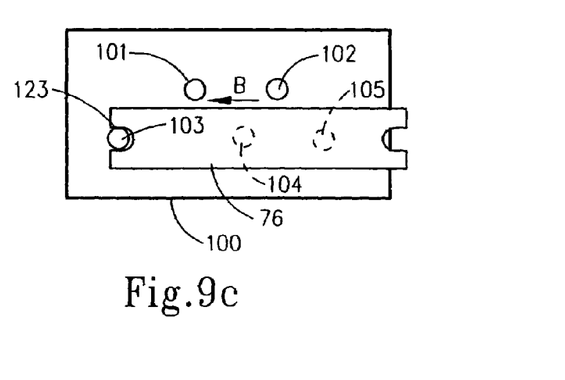
Figure 12:
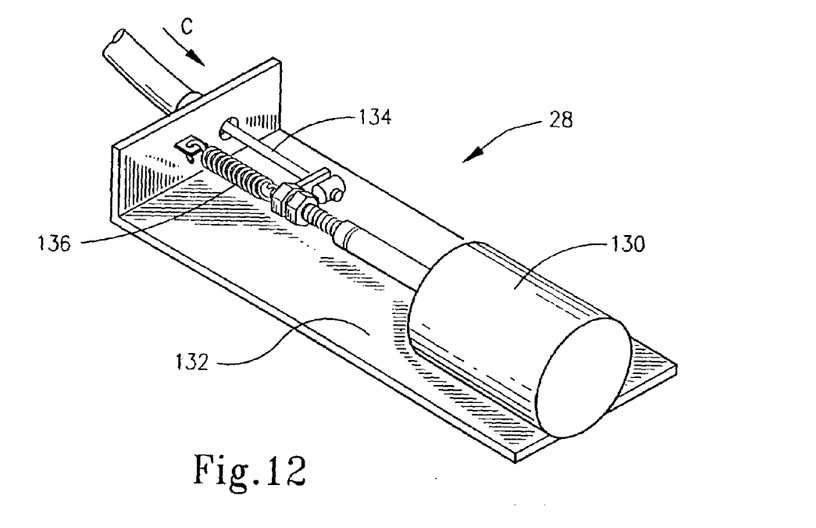
FIG. 12 is a perspective view of the actuator in the form of a solenoid used according to the present invention.

A similar result obtains for light paths 103–105 with respect to code plate 76 in FIG. 9(a), it may be seen that code plate 76 is in a leftmost position so that transmission port in the form of cutout 121 allows light to pass in light pass 105. This corresponds to the gear plane $P_1$ wherein the shift lever is in the leftmost position. Movement of code plate 76 in the direction of arrow "B" shifts it to the intermediate position shown in FIG. 9(b). Here, transmission port 122 is aligned with light transmission path 104 while light transmission paths 103 and 105 are blocked. This corresponds to shift plane $P_2$. Continued movement to the orientation shown in FIG. 9(c) places transmission port in the form of cutout 123 into alignment with light transmission path 103 with light transmission paths 104 and 105 being blocked. This corresponds, then, to gear plane $P_3$.

It should be noted that code plate 72 is super imposed over code plate 76 so that it would ordinarily block light in light transmission path 104 regardless of the orientation of code plate 76. This issue, however, may be eliminated by provided an elongated slot 115 in code plate 72 so that light path 104 may always transmit through slot 115 so that the coding of plate 76 will be effective.

The structure of the clutch latch mechanism 20 may now be appreciated with further reference to FIGS. 2, 11 and 10. With reference, then, to FIGS. 2 and 10–12, the clutch latch mechanism 20 is shown to include the clutch pedal latch mechanism 30 and actuator 28 therefore. Actuator 28 is in the form of a solenoid 130 that is mounted by means of a bracket 132 and operates a cable 134 when activated. Cable 134 is slideably received in a sheath 138. Thus, solenoid 130 serves to reciprocate cable 134 when so instructed by controller 18 through analog to digital converter 16. When activated, solenoid 130 pulls cable 134 in the direction of arrow "C" (FIG. 12) against the restoring force of spring 136. When deactivated, spring 136 returns cable 134 to the initial position in the direction opposite arrow "C".

The opposite end of cable 134 is also in sheath 138 which is secured to a bracket 140 and, specifically, to outwardly projecting arm 142 thereof. Bracket 140 is threadably received on the threaded shaft 144 so that its position therealong may be selectively adjusted. A pair of ears 146 are disposed in spaced apart relation at an end of bracket 140 opposite arm 142 and ear 146 pivotally support a latch bolt 148. Accordingly, bracket 140 defines a latch bolt support that is operative to mount latch bolt 148 relative to the vehicle. To this end, threaded shaft 144 has an end 150 that is secured to hinge plate 152 that is hingeably mounted to a hinge plate 154. With reference to FIG. 2, it may be seen that hinge plate 154 is secured to a portion of floorboard 156 so as to secure threaded shaft 144 and bracket 140 mounted thereon in a secure relationship relative to the vehicle. An opposite end portion 158 of threaded shaft 144 is tethered to floor portion 157 by means of a turnbuckle or other tether 160. This allows adjustment of the angle between hinge plates 152 and 154 to prevent adjustable positioning of latch bolt 148. To this end also, hinge 162 formed by hinge plates 152 and 154 may be spring loaded to bias plates 152 and 154 towards a larger acute angle.

With reference again to FIG. 2, a catch 164 is adjustably positioned on clutch pedal arm 34 and is held in position by means of a setscrew 166. Latch bolt 148 and catch 164 are positioned to interact with one another as is illustrated in FIGS. 10 and 11. Here, it may be seen that latch bolt 148 includes two arm portions 168 and 170, and an enlarged head 172 is disposed at the free end of arm portion 170. When cable 134 is retracted in the direction of arrow "C", latch bolt 148 pivots between an unlatched position shown in FIGS. 10 and 11 and a latch position as shown in phantom in FIG. 11. When in the unlatched position, clutch pedal 32 and clutch pedal arm 34 may be operated in a normal manner by the driver. However, when clutch pedal 32 is depressed, catch 164 moves passed latch pedal mechanism 30 such that, upon actuation of solenoid 130, latch bolt 148 pivots into the latch condition. When the driver thereafter removes pressure on clutch pedal 32, catch 164 engages head 172 of latch bolt 148 so that clutch pedal 32 is retained in the second or down position. This, then, corresponds to maintaining the clutch pedal in the second position and the clutch assembly in the disengaged state.

Figure 13:
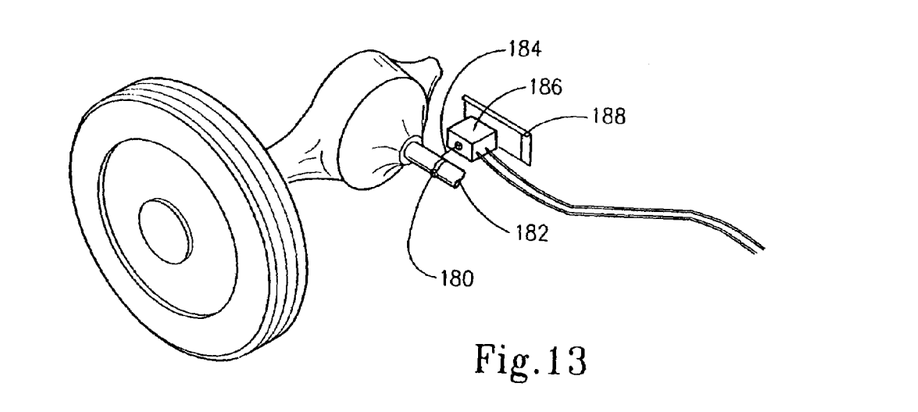
FIG. 13 is a perspective view of a representative speed monitor according to the present invention.

As noted above, activation of solenoid 130 and thus the movement of latch bolt 148 between the latch and unlatch positions is dictated by controller 18 based on the gear shift position of gear shift lever 26 as well as the speed of the vehicle. Accordingly, controller 18 must be informed of the speed of the vehicle by means of the speed sensor such as speed sensor 14. This sensor is illustrated in FIG. 13 wherein a magnet 180 is secured to drive shaft 182 of the vehicle. A Hall Effect sensor 184 and its associated electronics 186 are secured to a frame piece 188 of the vehicle so that Hall Effect sensor 184 is in close proximity to drive shaft 182. Each time drive shaft 182 rotates magnet 180 past Hall Effect sensor 184, an electric pulse is generated, as is known in the art. This rate of revolution corresponds to the speed of the vehicle. While this speed sensor has been shown to be mounted on the drive shaft, it should be appreciated that the monitor device could operate the rotational speed of any selected portion of the vehicle that would be indicative of its speed this could include, for example, the wheel of a vehicle, the axle of a vehicle, the drive shaft of a vehicle (FIG. 13) the output of the transmission or the input of the transmission. If desired, the speed signal could be taken off of the existing speedometer cable of the vehicle so that it is monitoring the rotational speed of a gear in the transmission.

In any event, the speed signal is presented to analog to digital converter 16 which converts this signal to a voltage pulse at a selected frequency corresponding to the rate of revolution of drive shaft 182. This speed signal is then communicated to controller 18 through DB 25 male connector 86. Therefore, controller 18 receives a signal corresponding to the speed of the vehicle as well as the gear state of the transmission as represented by the mechanical position of the gearshift lever 26. During a shifting operation, should the driver depress the clutch pedal from the first position shown in FIG. 2 to the second position thereby to disengage the transmission so as to effect a shifting operation, the driver then moves the gearshift lever into the desired gear. However, if the desired gear is too low for the existing speed of the vehicle such that any engine damage may occur, controller 18 generates a control/alarm signal which activates solenoid 130 pivoting latch bolt 48 into the latch position. When the driver thereafter releases pressure on the clutch, the clutch assembly remains disengaged because the clutch pedal cannot move from the second position back to the first position. Contemporaneously, alarm 200 provides an indication, either visual or audible, indicating to the driver that he/she has engaged a gear that is too low for the speed of the vehicle. This latch condition is maintained until such time that the vehicle's speed drops to a safe level, to neutral or otherwise to a higher gear state should the driver shift the transmission.

From the foregoing, it should be appreciated that the present invention contemplates a method of controlling enablement of the clutch assembly of a vehicle that has a frame and wheels and that is equipped with an engine selectively coupled through the clutch assembly to a manual transmission so as to drive the vehicle at a selected speed. Here, the clutch assembly has an enabled state wherein the engine and the transmission are coupled and disabled state wherein the engine and the transmission are not coupled. The transmission includes a plurality of gear states and a gearshift lever is moveable among a plurality of gearshift positions each corresponding to a selected one of the gear states.

Broadly, the method of controlling enablement of the clutch assembly comprises a first step of setting a maximum speed for at least a selected one of the gear states. During driving, the selected speed of the vehicle is monitored and the gearshift position of the gearshift lever is monitored to determine the gear state of the transmission. The method then includes the step of comparing the speed of the vehicle with the maximum speed for the selected one of the gear states when the clutch assembly is placed in the disabled state and the gear shift lever is thereafter moved in the gear shift position that corresponds to the selected one of the gear states. Thereafter, the method either permits the clutch assembly to move from the disabled state to the enabled state when the speed of the vehicle is no more than the maximum speed or prevents the clutch assembly from moving from the disabled state to the enable state when the speed of the vehicle exceeds the maximum speed.

According to the method of this invention, it is desired that the method include that step of setting a maximum speed for a plurality of selected gear states and the step of comparing the speed of the vehicle with the maximum speed for each of the plurality of gear states occurs when the clutch assembly is placed in the disabled state and gear shift lever is thereafter moved into the gear shift position that corresponds to a respective one of a plurality of gear states. Again, the method includes the step of either permitting the clutch assembly to move from the disabled state to the enabled state when the speed of the vehicle is no more than the maximum speed or prevents the clutch assembly from moving the disabled state to the enabled state when the speed of the vehicle exceeds the maximum speed.

The broad method may also include the step of preventing the clutch assembly from moving from the disabled state to the enabled state by mechanically locking the clutch assembly. This step can be accomplished by mechanically latching the clutch pedal in a second position that corresponds to the disabled state to prevent it from moving into a first position that corresponds to the enabled state. Further, this step may be specifically accomplished by latching the clutch pedal arm.

The step of monitoring the speed of the vehicle may be accomplished by monitoring rotational speed of at least one of a group consisting of a wheel of the vehicle, an axle of the vehicle, a drive shaft of the vehicle, an output of the transmission, an input of the transmission or a gear associated with the transmission.

To establish the maximum speeds, it is contemplated that the driver undergo an initial calibration of the system. Here, controller 18 is placed in electrical communication with the clutch control assembly. The driver then drives the vehicle and accelerates through a plurality of gears taking the engine near the red line for each gear or to some other selected maximum speed. Controller 18 registers the speed of the vehicle at which the driver shifts during this acceleration calibration for each of the plurality of gear shift position for which monitoring and control is desired. After calibration, the computer controller stores in its memory the gear state and the maximum speed driven at that gear state. Thus, during a deceleration and downshift, the controller will keep the clutch disabled at any time the speed of the vehicle exceeds the calibrated maximum for that particular gear state. Where the memory of controller 18 is sufficient, it may store these speeds for multiple driving excursions without the need to recalibrate.

Further, in the method of the present invention, the step of monitoring the gearshift position may be accomplished by a position detector mechanically linked to the gearshift lever. This position detector may include at least one code plate linked to the gearshift lever and an encoder operative to generate a gear state signal in response to a position of the code plate relative thereto. The encoder may be an optical device, as described above.

Further, to avoid any errors that may result from the natural mechanical play of a gearshift lever, the gearshift position sensor first determines the gearshift plane of the gearshift lever utilizing the second code plate 76. Once this gearshift plane is determined and the driver begins shifting out of the neutral gearshift level to either gearshift level $L_1$ or $L_2$, the controller ignores deviations that thereafter occur in the gearshift plane. The controller then looks for the encoded pattern as determined by first code plate 72 to determine which gear shift level is entered for the now identified gear shift plane. Accordingly, the method according to the present invention includes the step of monitoring the gear shift position wherein that step is accomplished by fist determining a gear shift plane for the gear shift lever and thereafter determining to which level within said gear shift lever is moved.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A clutch control system adapted for use on a vehicle having a frame and wheels and equipped with an engine selectively coupled through a clutch assembly to a manual transmission so as to drive the vehicle at selected speed, said clutch assembly having an enabled state wherein the engine and the transmission are coupled and a disabled state wherein the engine and the transmission are not coupled, said transmission including a plurality of gear states and including a gearshift lever movable among a plurality of gearshift positions each corresponding to a selected one of the gear states, said clutch control system comprising:

(A) a gearshift lever sensor mechanically coupled to said gearshift lever and operative to sense at least one of the gearshift positions corresponding to a selected one of the gear states and to produce a gear state signal indicative thereof;

(B) a monitor device operative to produce a speed signal indicative of the speed of the vehicle;

(C) a selectively actuable latch mechanism associated with said clutch assembly and having a unlock state that allows said clutch assembly to move from the disabled state to the enabled state and a lock state that prevents said clutch assembly from moving from the disabled state to the enabled state; and (D) a controller operative in response to said gear state signal and said speed signal to place said latch mechanism in the lock state when the speed of the vehicle is above a pre-selected maximum speed for the selected one of the gear states.

2. A clutch control system according to claim 1 wherein said monitor device is operative to monitor rotational speed of at least one of a group consisting of: a wheel of the vehicle, an axle of the vehicle, a drive shaft of the vehicle, an output of the transmission, an input of the transmission and a transmission gear.

3. A clutch control system according to claim 1 wherein said vehicle includes a reciprocating clutch pedal linked to said clutch assembly and operative to move between a first position wherein said clutch assembly is in the enabled state and a second position wherein said clutch assembly is in the disabled state, said latch mechanism being associated with said clutch pedal and operative to move between a clutch pedal lock position wherein said clutch pedal is held in the second position and a clutch pedal release position wherein said clutch pedal may move from the second position to the first position.

4. A clutch control system according to claim 1 wherein said gearshift lever sensor is operative to sense a plurality of different gearshift positions and produce a respective gear state signal indicative thereof.

5. A clutch control system according to claim 1 wherein said gearshift lever sensor includes a gearshift follower engaging said gearshift lever and operative to follow the motion thereof and a position detector associated with said gearshift lever follower, said position detector operative to sense the gearshift position and generate the gear state signal corresponding thereto.

6. A clutch control system according to claim 5 wherein said position detector includes an optical encoder.

7. A clutch control system according to claim 5 wherein said gearshift follower includes a first slide bracket having a pair of spaced-apart first arms for receipt of said gearshift lever therebetween such that said gearshift lever can reciprocate in a first direction between a plurality of shift levels while said first slide bracket remains stationary and a second slide bracket having a pair of spaced-apart second arms for receipt of said gearshift lever therebetween such that said gearshift lever can reciprocate in a second direction between a plurality of shift planes while said second slide bracket remains stationary, the first and second directions being orthogonal to one another.

8. A clutch control system according to claim 7 wherein said first slide bracket is biased toward a selected shift level and wherein said second slide bracket is biased toward a selected shift plane.

9. A clutch control system according to claim 1 including an alarm associated with said controller and operative to display an alarm condition when said controller places said latch mechanism in the lock state.

10. A control system adapted for use on a vehicle having a frame and wheels and equipped with an engine selectively coupled through a clutch assembly to a manual transmission so as to drive the vehicle at selected speed, said clutch assembly having an enabled state wherein the engine and the transmission are coupled and a disabled state wherein the engine and the transmission are not coupled, said transmission including a plurality of gear states and including a gearshift lever movable among a plurality of gearshift positions each corresponding to a selected shift plane and a selected shift level each correlated to one of the gear states, said clutch control system comprising:

(A) a housing adapted to mount proximately to said gearshift lever;

(B) a gearshift follower supported by said housing and including a first slide bracket having a pair of spaced-apart first arms for engaging said gearshift lever therebetween and operative to follow the motion thereof such that said gearshift lever can reciprocate in a first direction between a plurality of shift levels while said first slide bracket remains stationary in a selected shift plane and a second slide bracket having a pair of spaced-apart second arms for engaging said gearshift lever therebetween and operative to follow the motion thereof such that said gearshift lever can reciprocate in a second direction between a plurality of shift planes while said second slide bracket remains stationary in a selected shift level;

(C) a position detector supported by said housing and associated with said gearshift lever follower, said position detector operative to sense the gearshift position and generate a gear state signal corresponding thereto, said position detector including an encoder, a first code plate connected to said first slide bracket and cooperating with said encoder to produce a first position signal corresponding to the shift level of said gearshift lever and a second code plate connected to said second slide bracket and cooperating with said encoder to produce a second position signal corresponding to the shift plane of said gearshift lever, said first and second position signals defining the gear state signal;

(D) a monitor device operative to produce a speed signal indicative of the speed of the vehicle;

(E) a selectively actuable latch mechanism associated with said clutch assembly and having a unlock state that allows said clutch assembly to move from the disabled state to the enabled state and a lock state that prevents said clutch assembly from moving from the disabled state to the enabled state; and (F) a controller operative in response to said gear state signal and said speed signal to place said latch mechanism in the lock state when the speed of the vehicle is above a pre-selected maximum speed for the selected one of the gear states.

11. A clutch control system according to claim 10 wherein said vehicle includes a reciprocating clutch pedal linked to said clutch assembly and operative to move between a first position wherein said clutch assembly is in the enabled state and a second position wherein said clutch assembly is in the disabled state, said latch mechanism being associated with said clutch pedal and operative to move between a clutch pedal lock position wherein said clutch pedal is held in the second position and a clutch pedal release position wherein said clutch pedal may move from the second position to the first position.

12. A clutch control system according to claim 11 wherein said clutch pedal is supported by a reciprocating clutch pedal arm linked to said clutch assembly, said latch mechanism including a catch disposed on said clutch pedal arm and a latch bolt movable between an unlatch position defining the unlock state wherein said clutch pedal may move from the second position into the first position and a latch position defining the lock state wherein said latch bolt engages said catch thereby to prevent said clutch pedal from moving from the second position into the first position.

13. A clutch control system according to claim 12 wherein said catch is positionably adjustable relative to said clutch pedal arm.

14. A clutch control system according to claim 12 including a latch bolt support operative to mount said latch bolt relative to said vehicle.

15. A clutch control system according to claim 14 wherein said latch bolt is pivotally disposed on said latch bolt support such that said latch bolt pivots between the latch and unlatch positions.

16. A clutch control system according to claim 12 including a solenoid drive operative to move said latch bolt from the unlatch position to the latch position.

17. A clutch control system according to claim 10 wherein said first slide bracket is supported for sliding movement relative to said housing by a pair of spaced-apart first rails and wherein said second slide bracket is supported for sliding movement relative to said housing by a pair of spaced-apart second rails.

18. A clutch control system according to claim 10 wherein said encoder is an optical encoder supported by said housing and including array of light sources and an array of light sensors, said first and second code plates interposed between said array of light sources and said array of light sensors, said first and second code plate including a plurality of transmission ports.

19. A clutch control system according to claim 10 wherein said first slide bracket is biased toward a selected shift level and wherein said second slide bracket is biased toward a selected shift plane.

20. A clutch control system according to claim 10 including an alarm associated with said controller and operative to display an alarm condition when said controller places said latch mechanism in the lock state.

21. In a vehicle having a frame and wheels and equipped with an engine selectively coupled through a clutch assembly to a manual transmission so as to drive the vehicle at selected speed, said clutch assembly having an enabled state wherein the engine and the transmission are coupled and a disabled state wherein the engine and the transmission are not coupled, said transmission including a plurality of gear states and including a gearshift lever movable among a plurality of gearshift positions each corresponding to a selected one of the gear states, a method of controlling enablement of said clutch assembly comprising:

(A) setting a maximum speed for at least a selected one of said gear states;

(B) monitoring the selected speed of the vehicle;

(C) monitoring the gearshift position of said gearshift lever to determine the gear state of said transmission; and (D) comparing the speed of the vehicle with the maximum speed for said selected one of said gear states when said clutch assembly is placed in the disabled state and said gearshift lever is thereafter moved into in the gearshift position that corresponds to the selected one of said gear states and thereafter either (1) permitting said clutch assembly to move from the disabled state to the enabled state when the speed of the vehicle is no more than said maximum speed or (2) preventing said clutch assembly from moving from the disabled state to the enabled state when the speed of the vehicle exceeds the maximum speed.

22. A method according to claim 21 including the step of setting a maximum speed for a plurality of selected gear states and the step of comparing the speed of the vehicle with the maximum speed for each of said plurality of gear states when said clutch assembly is placed in the disabled state and said gearshift lever is thereafter moved into in the gearshift position that corresponds to a respective one of said plurality of gear states and thereafter either
  (1) permitting said clutch assembly to move from the disabled state to the enabled state when the speed of the vehicle is no more than said maximum speed or
  (2) preventing said clutch assembly from moving from the disabled state to the enabled state when the speed of the vehicle exceeds the maximum speed.

23. A method according to claim 21 wherein the step of preventing said clutch assembly from moving form the disabled state to the enabled state is accomplished by mechanically locking said clutch assembly.

24. A method according to claim 23 wherein said vehicle includes a reciprocating clutch pedal supported by a reciprocating clutch pedal arm linked to said clutch assembly and operative to move between a first position wherein said clutch assembly is in the enabled state and a second position wherein said clutch assembly is in the disabled state, the step of preventing said clutch assembly from moving form the disabled state to the enabled state is accomplished by mechanically latching said clutch pedal in the second position.

25. A method according to claim 24 wherein the step of latching said clutch pedal in the second position is accomplished by latching the clutch pedal arm.

26. A method according to claim 21 wherein the step of monitoring the speed of the vehicle is accomplished by monitoring rotational speed of at least one of a group consisting of: a wheel of the vehicle, an axle of the vehicle, a drive shaft of the vehicle, an output of the transmission and an input of the transmission.

27. A method according to claim 21 wherein the step of setting the maxim speed is accomplished by storing shift data and speed data in a memory of a computer processor wherein said speed data is correlated to a maximum speed for the selected one of said gear states and wherein said shift data corresponds to the gear shift position corresponding to the selected one of said gear states.

28. A method according to claim 21 wherein the step of monitoring the gearshift position is accomplished by a position detector mechanically linked to said gearshift lever.

29. A method according to claim 28 wherein said position detector includes at least one code plate linked to said gearshift lever and an encoder operative to generate a gear state signal in response to a position of said code plate relative thereto.

30. A method according to claim 29 wherein said encoder is an optical device.

31. A method according to claim 21 wherein the step of monitoring the gearshift position is accomplished by first determining a gearshift plane for said gearshift lever and thereafter determining to which level within said gearshift plane said gearshift lever is moved.

32. A clutch control system adapted for use on a vehicle having a frame and wheels and equipped with an engine selectively coupled through a clutch assembly to a manual transmission so as to drive the vehicle at selected speed, said clutch assembly having an enabled state wherein the engine and the transmission are coupled and a disabled state wherein the engine and the transmission are not coupled, said vehicle including a reciprocating clutch pedal supported by a reciprocating clutch pedal arm linked to said clutch assembly, said clutch pedal operative to move between a first position wherein said clutch assembly is in the enabled state and a second position wherein said clutch assembly is in the disabled state, said transmission including a plurality of gear states and including a gearshift lever movable among a plurality of gearshift positions each corresponding to a selected one of the gear states, said clutch control system comprising:
  (A) a gearshift lever sensor mechanically coupled to said gearshift lever and operative to sense at least one of the gearshift positions corresponding to a selected one of the gear states and to produce a gear state signal indicative thereof;
  (B) a monitor device operative to produce a speed signal indicative of the speed of the vehicle;
  (C) a selectively actuable latch mechanism associated with said clutch pedal arm and including a catch disposed on said clutch pedal arm and a latch bolt movable between an unlatch position defining a clutch pedal unlock state wherein said clutch pedal may move from the second position into the first position and a latch position defining a lock state wherein said latch bolt engages said catch thereby to prevent said clutch pedal from moving from the second position into the first position; and
  (D) a controller operative in response to said gear state signal and said speed signal to place said latch mechanism in the lock state when the speed of the vehicle is above a pre-selected maximum speed for the selected one of the gear states.

33. A clutch control system according to claim 32 wherein said catch is positionably adjustable relative to said clutch pedal arm.

34. A clutch control system according to claim 32 including a latch bolt support operative to mount said latch bolt relative to said vehicle.

35. A clutch control system according to claim 34 wherein said latch bolt is pivotally disposed on said latch bolt support such that said latch bolt pivots between the latch and unlatch positions.

36. A clutch control system according to claim 34 wherein said latch bolt support is movable relative to the vehicle whereby the position of said latch bolt relative to said clutch pedal may be adjusted.

37. A clutch control system according to claim 32 including an actuator operative to drive said latch bolt from the unlatch position to the latch position.

38. A clutch control system according to claim 37 wherein said latch bolt is biased into the unlatch position.

39. A clutch control system according to claim 32 including a solenoid drive operative to move said latch bolt from the unlatch position to the latch position.

40. A clutch control system adapted for use on a vehicle having a frame and wheels and equipped with an engine selectively coupled through a clutch assembly to a manual transmission so as to drive the vehicle at selected speed, said clutch assembly having an enabled state wherein the engine and the transmission are coupled and a disabled state wherein the engine and the transmission are not coupled, said transmission including a plurality of gear states and including a gearshift lever movable among a plurality of gearshift positions each corresponding to a selected one of the gear states, said clutch control system comprising:
  (A) a gearshift lever sensor mechanically coupled to said gearshift lever and operative to sense at least one of the gearshift positions corresponding to a selected one of the gear states wherein said gearshift lever sensor includes a gearshift follower engaging said gearshift lever and operative to follow the motion thereof and a position detector associated with said gearshift lever follower, wherein said position detector includes an optical encoder that includes at least one light source, at least one light sensor and at least one code plate interposed between said light source and said light sensor, said code plate having a transmission port coded to the gearshift position and operative to permit said light sensor to receive light from said light source when said gearshift lever moves into the gearshift position thereby to generate a gear state signal;

(B) a monitor device operative to produce a speed signal indicative of the speed of the vehicle;

(C) a selectively actuable latch mechanism associated with said clutch assembly and having a unlock state that allows said clutch assembly to move from the disabled state to the enabled state and a lock state that prevents said clutch assembly from moving from the disabled state to the enabled state; and (D) a controller operative in response to said gear state signal and said speed signal to place said latch mechanism in the lock state when the speed of the vehicle is above a pre-selected maximum speed for the selected one of the gear states.

41. A clutch control system according to claim 40 wherein said gearshift lever sensor is operative to sense a plurality of different gearshift positions and produce a respective gear state signal indicative thereof, said optical encoder including an array of light sources and an array of light sensors with said code plate including a plurality of transmission ports corresponding to the plurality of different gearshift lever positions.

42. A clutch control system according to claim 41 wherein said gearshift lever moves in a plurality of gearshift planes and in a plurality of gearshift levels and including first and second code plates, said first code plate operative to determine the level of said gearshift lever and said second code plate operative to determine the plane of said gearshift lever.

* * * * *